United States Patent
Yang et al.

(10) Patent No.: US 12,326,770 B2
(45) Date of Patent: Jun. 10, 2025

(54) POWER SUPPLY CIRCUIT, CHIP, AND ELECTRONIC DEVICE

(71) Applicant: Bitmain Technologies Inc., Beijing (CN)

(72) Inventors: Bin Yang, Beijing (CN); Xiangchao Liu, Beijing (CN); Fei Wu, Beijing (CN)

(73) Assignee: Bitmain Technologies Inc., Beijing (CN)

( * ) Notice: Subject to any disclaimer, the term of this patent is extended or adjusted under 35 U.S.C. 154(b) by 108 days.

(21) Appl. No.: 18/027,421

(22) PCT Filed: Nov. 16, 2021

(86) PCT No.: PCT/CN2021/131002
§ 371 (c)(1),
(2) Date: Mar. 21, 2023

(87) PCT Pub. No.: WO2022/057956
PCT Pub. Date: Mar. 24, 2022

(65) Prior Publication Data
US 2023/0333623 A1    Oct. 19, 2023

(30) Foreign Application Priority Data
Sep. 21, 2020 (CN) .......................... 202010993666.7

(51) Int. Cl.
*G06F 1/3203* (2019.01)
*G06F 1/26* (2006.01)
(Continued)

(52) U.S. Cl.
CPC .................................. *G06F 1/3203* (2013.01)

(58) Field of Classification Search
CPC . G06F 1/3203; G06F 1/26; G06F 1/28; G06F 1/30
See application file for complete search history.

(56) References Cited

U.S. PATENT DOCUMENTS

| | | | | |
|---|---|---|---|---|
| 2007/0079162 A1* | 4/2007 | Mundada | .................. | G06F 1/26 713/330 |
| 2009/0153210 A1* | 6/2009 | Wang | ........................ | G06F 1/32 327/198 |

(Continued)

FOREIGN PATENT DOCUMENTS

| CN | 106774767 A | 5/2017 |
|---|---|---|
| CN | 207603445 U | 7/2018 |

(Continued)

OTHER PUBLICATIONS

International Search Report of corresponding International Application No. PCT/CN2021/131002, dated Feb. 11, 2022, 12 pages.

(Continued)

*Primary Examiner* — Jaweed A Abbaszadeh
*Assistant Examiner* — Gayathri Sampath
(74) *Attorney, Agent, or Firm* — Tucker Ellis LLP

(57) ABSTRACT

The present application discloses a power supply circuit, a chip and an electronic device. The circuit comprises: a power module, configured to supply power to a computing chip in serial connection; a first power management module, connected with the power module and the computing chip, and configured to supply power to a core of the computing chip according to a voltage provided by the power module; and at least one second power management module, connected with the power module and the computing chip, and configured to supply power to at least one voltage domain of the computing chip according to the voltage provided by the power module correspondingly before the first power management module supplies power to the core.

17 Claims, 4 Drawing Sheets

(51) Int. Cl.
*G06F 1/28* (2006.01)
*G06F 1/30* (2006.01)

(56) References Cited

U.S. PATENT DOCUMENTS

| | | | | |
|---|---|---|---|---|
| 2011/0084553 | A1* | 4/2011 | Adest | H02J 3/381 |
| | | | | 307/63 |
| 2012/0054511 | A1* | 3/2012 | Brinks | G06F 1/3243 |
| | | | | 713/310 |
| 2014/0359311 | A1* | 12/2014 | Jahagirdar | G06F 9/5094 |
| | | | | 713/300 |
| 2016/0105179 | A1 | 4/2016 | Kerr et al. | |
| 2019/0369686 | A1 | 12/2019 | Zhang et al. | |
| 2020/0050224 | A1* | 2/2020 | Vakilian | G05F 1/56 |
| 2020/0142461 | A1 | 5/2020 | Holm | |

FOREIGN PATENT DOCUMENTS

| | | |
|---|---|---|
| CN | 207976832 U | 10/2018 |
| CN | 108809068 A | 11/2018 |
| CN | 109874314 A | 6/2019 |
| CN | 209182771 U | 7/2019 |
| CN | 110221935 A | 9/2019 |
| CN | 210297545 U | 4/2020 |
| CN | 111142641 A | 5/2020 |
| CN | 112256115 A | 1/2021 |

OTHER PUBLICATIONS

First Office Action of corresponding Chinese Application No. 202010993666.7, dated Feb. 25, 2022, 13 pages.

Notice of Allowance of corresponding Chinese Application No. 202010993666.7, dated Apr. 24, 2022, 4 pages.

* cited by examiner

POWER SUPPLY CIRCUIT, CHIP, AND ELECTRONIC DEVICE

The present application is a National Stage of the International Application No. PCT/CN2021/131002, filed on Nov. 16, 2021, which claims priority to Chinese Patent Application No. 202010993666.7, titled "POWER SUPPLY CIRCUIT, CHIP, AND ELECTRONIC DEVICE", filed to China National Intellectual Property Administration on Sep. 21, 2020, both of the aforementioned applications are hereby incorporated by reference in their entireties.

TECHNICAL FIELD

The present application relates to the field of circuit technology, and in particular, to a power supply circuit, a chip and an electronic device.

BACKGROUND

In a current series power supply system of a chip, that is, when supplying power to the chip, a core power supply is generally connected in series with a chip IO power supply. The core power supply is powered first, and the IO power supply is generated in stages from the series core power supply. That is to say, in the current series power supply system, the core power supply is powered before the IO power supply is powered, which may easily bring some potential risks, such as unbalanced voltage domain, which may lead to abnormal operation or even burning of the chip, thus damaging the system circuit and reducing the circuit safety.

SUMMARY

The present application aims to solve at least one of the technical problems existing in the prior art.

Therefore, an object of the present application is to provide a power supply circuit, which can power a voltage domain before a core of a computing chip is powered, so as to realize that an IO power supply of the multiple-voltage domain computing chip is activated earlier than a core power supply, avoid the potential risks caused by the IO power supply of the computing chip being powered later than the core power supply, and improve the security of the power supply circuit.

Therefore, a second object of the present application is to provide a chip.

Therefore, a third object of the present application is to provide an electronic device.

In order to achieve the above object, an embodiment of the first aspect of the present application discloses a power supply circuit, including: a power module, configured to supply power to a computing chip in serial connection; a first power management module, connected with the power module and the computing chip, and configured to supply power to a core of the computing chip according to voltage provided by the power module; and at least one second power management module, connected with the power module and the computing chip, and configured to supply power to at least one voltage domain of the computing chip according to the voltage provided by the power module correspondingly before the first power management module supplies power to the core.

According to the power supply circuit according to an embodiment of the present application, before the first power management module supplies power to the core of the computing chip according to the voltage provided by the power module, the second power management module supplies power to the corresponding voltage domain according to the voltage provided by the power module in the first place. That is, the voltage domain can be powered before the core of the computing chip is powered, thereby realizing that the IO power supply of the multi-voltage domain computing chip is activated before the core power supply, avoiding the potential risk caused by the IO power supply of the computing chip being powered later than the core power supply, and improving the safety of the power supply circuit.

In addition, the power supply circuit of the above embodiment of the present application may also include the following additional technical features.

In some examples, the first power management module includes: a first power conversion unit connected with the power module and the core of the computing chip, respectively.

In some examples, the second power management module includes: a second power conversion unit connected with the power module; at least one voltage stabilizing module correspondingly connected in series between the second power conversion unit and the corresponding at least one voltage domain, where the power module correspondingly supplies power to the at least one voltage domain through the second power conversion unit and the at least one voltage stabilizing module before the first power management module supplies power to the core.

In some examples, wherein each of the voltage stabilizing module includes a first diode, a second diode, a capacitor, a first voltage stabilizing unit and a second voltage stabilizing unit, wherein, a cathode of the first diode is connected with a cathode of the second diode, an anode of the first diode is connected with the second power conversion unit, and the connection point of the cathode of the first diode and the cathode of the second diode is connected with one end of the capacitor; another end of the capacitor is connected to ground, and one end of the capacitor is further connected with one end of the first voltage stabilizing unit; another end of the first voltage stabilizing unit is connected with one end of the second voltage stabilizing unit; and another end of the second voltage stabilizing unit is connected with a corresponding voltage domain.

In some examples, the power module supplies power to the capacitor through the second power conversion unit before the first power management module supplies power to the core; when the first power management module supplies power to the core, a potential of the capacitor is raised, and the capacitor supplies power to the first voltage stabilizing unit and the second voltage stabilizing unit through power stored in the capacitor; and after the first power management module supplies power to the core, the core of the computing chip supplies power to the capacitor.

In some examples, the second power management module further includes: a third power conversion unit, connected with a voltage domain among the at least one voltage domain which is connected with the first power management module through one of the first voltage stabilizing unit and one of the second voltage stabilizing unit, and configured to supply power to the voltage domain.

In some examples, the second power management module includes: at least one fourth power conversion unit connected with the power module; at least one third voltage stabilizing unit, and the at least one third voltage stabilizing unit is correspondingly connected in series between the at least one fourth power conversion unit and the corresponding at least one voltage domain.

In some examples, the second power management module includes: at least one fourth voltage stabilizing unit and at least one fifth voltage stabilizing unit connected in series in a one-to-one correspondence, where the at least one fourth voltage stabilizing unit is respectively connected with the power module, and the at least one fifth voltage stabilizing unit is correspondingly connected with the at least one voltage domain.

In order to achieve the above object, an embodiment of the second aspect of the present application discloses a chip including the power supply circuit described in the above embodiment of the present application.

According to the chip of the embodiment of the application, the power supply circuit of which, before the first power management module supplies power to the core of the computing chip according to the voltage provided by the power module, the second power management module supplies power to the corresponding voltage domain according to the voltage provided by the power module in the first place. That is, the voltage domain can be powered before the core of the computing chip is powered, thereby realizing that the IO power supply of the multi-voltage domain computing chip is activated before the core power supply, avoiding the potential risk caused by the IO power supply of the computing chip being powered later than the core power supply, and improving the safety of the power supply circuit.

In order to achieve the above object, an embodiment of the third aspect of the present application discloses an electronic device, which includes the power supply circuit described in the first aspect of the present application or the chip described in the second aspect of the present application.

The electronic device according to the embodiment of the present application, the power supply circuit or chip of which, before the first power management module supplies power to the core of the computing chip according to the voltage provided by the power module, the second power management module supplies power to the corresponding voltage domain according to the voltage provided by the power module in the first place. That is, the voltage domain can be powered before the core of the computing chip is powered, thereby realizing that the IO power supply of the multi-voltage domain computing chip is activated before the core power supply, avoiding the potential risk caused by the IO power supply of the computing chip being powered later than the core power supply, and improving the safety of the power supply circuit.

Additional aspects and advantages of the application will be set forth in part in the description which follows, and part of which will be obvious from the description which follows, or may be learned by practice of the application.

BRIEF DESCRIPTION OF DRAWINGS

The above and/or additional aspects and advantages of the present application will be apparent and easily understood from the description of the embodiments taken in conjunction with the following drawings, in which.

Figure 1:
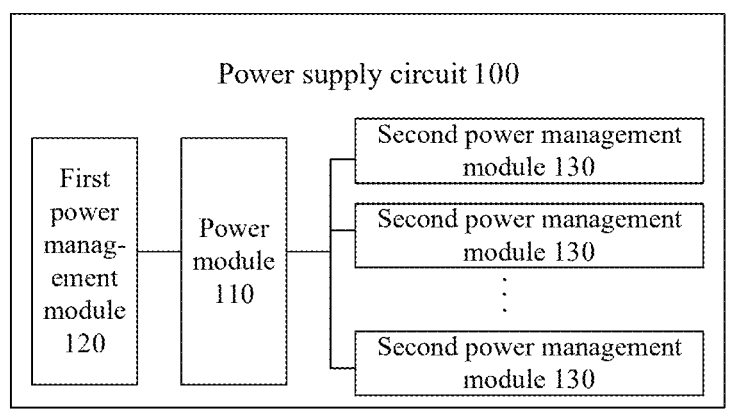
FIG. 1 is a structural block diagram of a power supply circuit according to an embodiment of the present application.

REFERENCE SIGNS power supply circuit 100; power module 110; a first power management module 120; a second power management module 130; a first power conversion unit 121; a second power conversion unit 131; a voltage stabilizing module 132; a third power conversion unit 133; a first diode 1321; a second diode 1322; capacitor 1323; a first voltage stabilizing unit 1324; a second voltage stabilizing unit 1325; a fourth power conversion unit 134; a third voltage stabilizing unit 135; a fourth voltage stabilizing unit 136; a fifth voltage stabilizing unit 137.

DESCRIPTION OF EMBODIMENTS

The embodiments of the present application will be described in detail below. The embodiments described with reference to the accompanying drawings are exemplary, and the embodiments of the present application will be described in detail below.

Hereinafter, a power supply circuit, a chip and an electronic device according to embodiments of the present application will be described with reference to FIG. 1 to FIG. 4.

FIG. 1 is a schematic structural diagram of a power supply circuit according to an embodiment of the present application. As shown in FIG. 1, the power supply circuit 100 includes: a power module 110, a first power management module 120 and a second power management module 130.

The power module 110 is used to supply power to a computing chip in serial connection. The computing chip in serial connection includes at least two voltage domains.

The first power management module 120 is connected with the power module 110 and the computing chip, and is configured to supply power to a core of the computing chip according to a voltage provided by the power module 110. In other words, the first power management module 120 is configured to supply power to a core power supply of the computing chip according to the voltage provided by the power module 110.

The at least one second power management module 130 is connected with the power module 110 and the computing chip, and is configured to supply power to at least one voltage domain of the computing chip correspondingly according to the voltage provided by the power module 110 before the first power management module 120 supplies power to the core of the computing chip. In other words, the second power management module 130 is configured to supply power to the IO power supply of the computing chip according to the voltage provided by the power module 110 before the first power management module 120 supplies power to the core of the computing chip.

Therefore, in this power supply circuit 100, before the first power management module 120 supplies power to the core of the computing chip according to the voltage provided by the power module 110, the second power management module 130 first supplies power to a corresponding voltage domain according to the voltage provided by the power module 110. That is, the voltage domain can be powered before the core of the computing chip is powered, so that the IO power supply of the computing chip with multiple voltage domains can be activated before the core power supply, avoiding the potential risks caused by the IO power supply of the computing chip being powered later than the core power supply, and improving the safety of the power supply circuit 100.

Figure 2:
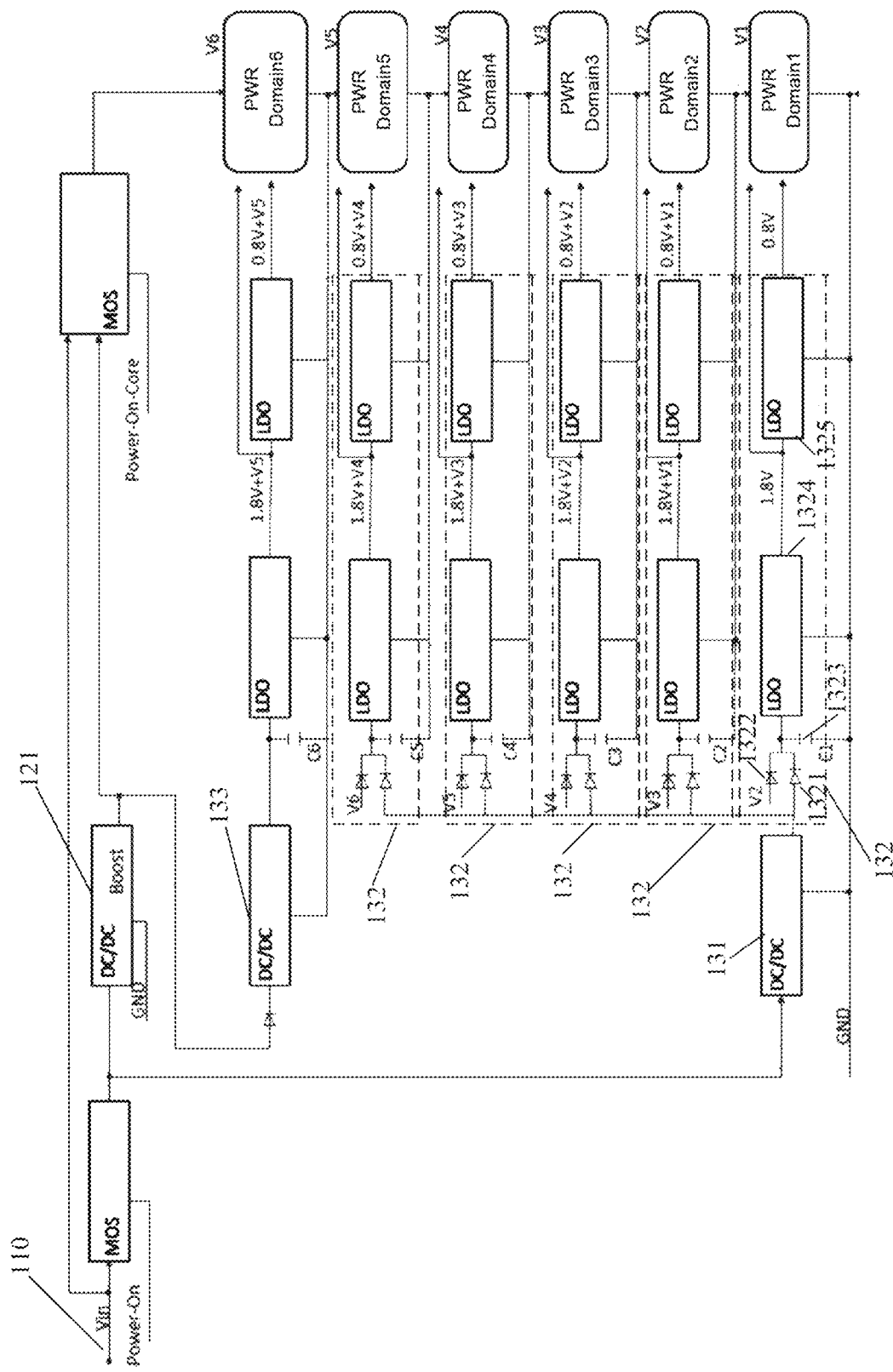
FIG. 2 is a detailed schematic diagram of a power supply circuit according to an embodiment of the present application.
Figure 3:
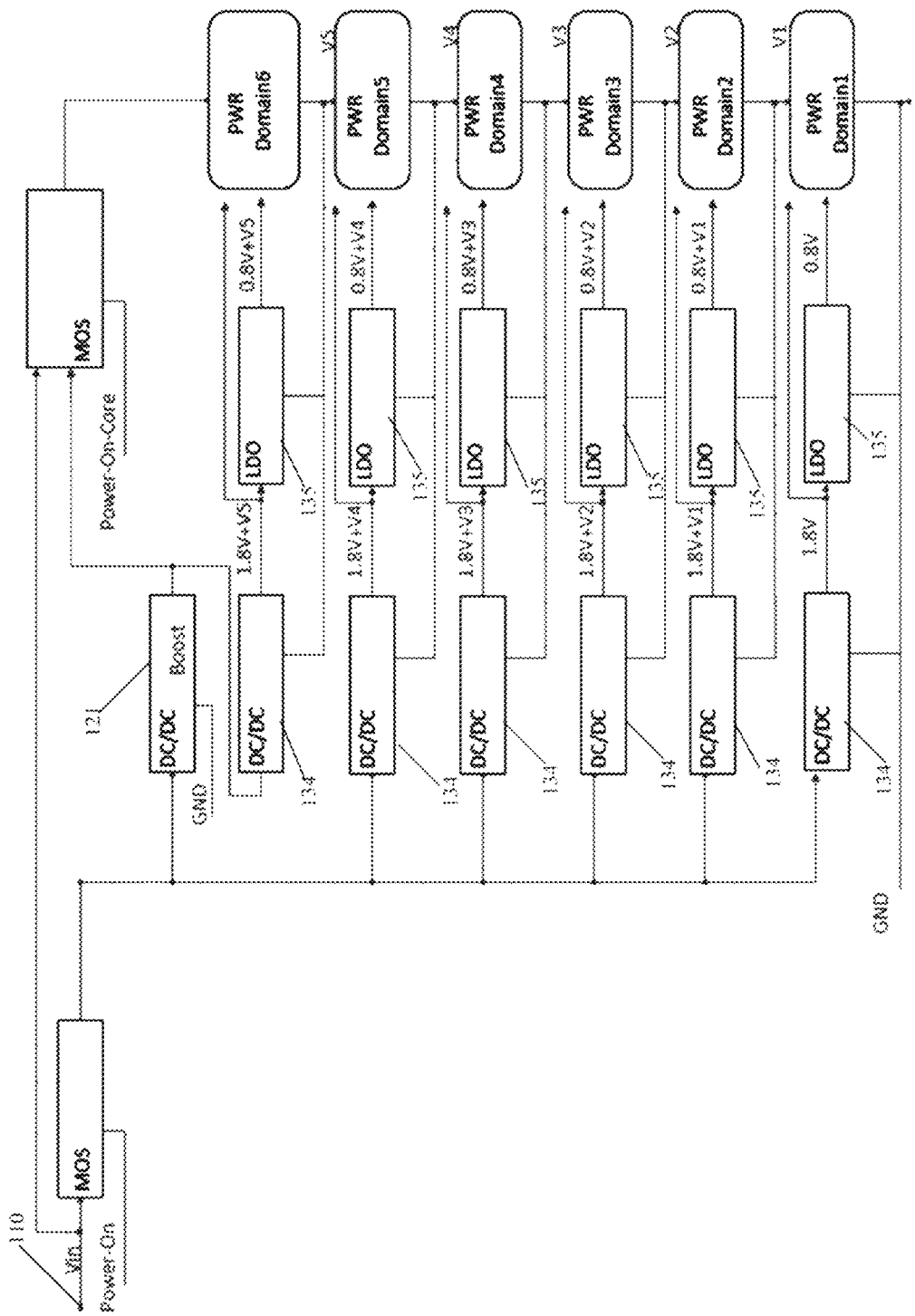
FIG. 3 is a detailed schematic diagram of a power supply circuit according to another embodiment of the present application.
Figure 4:
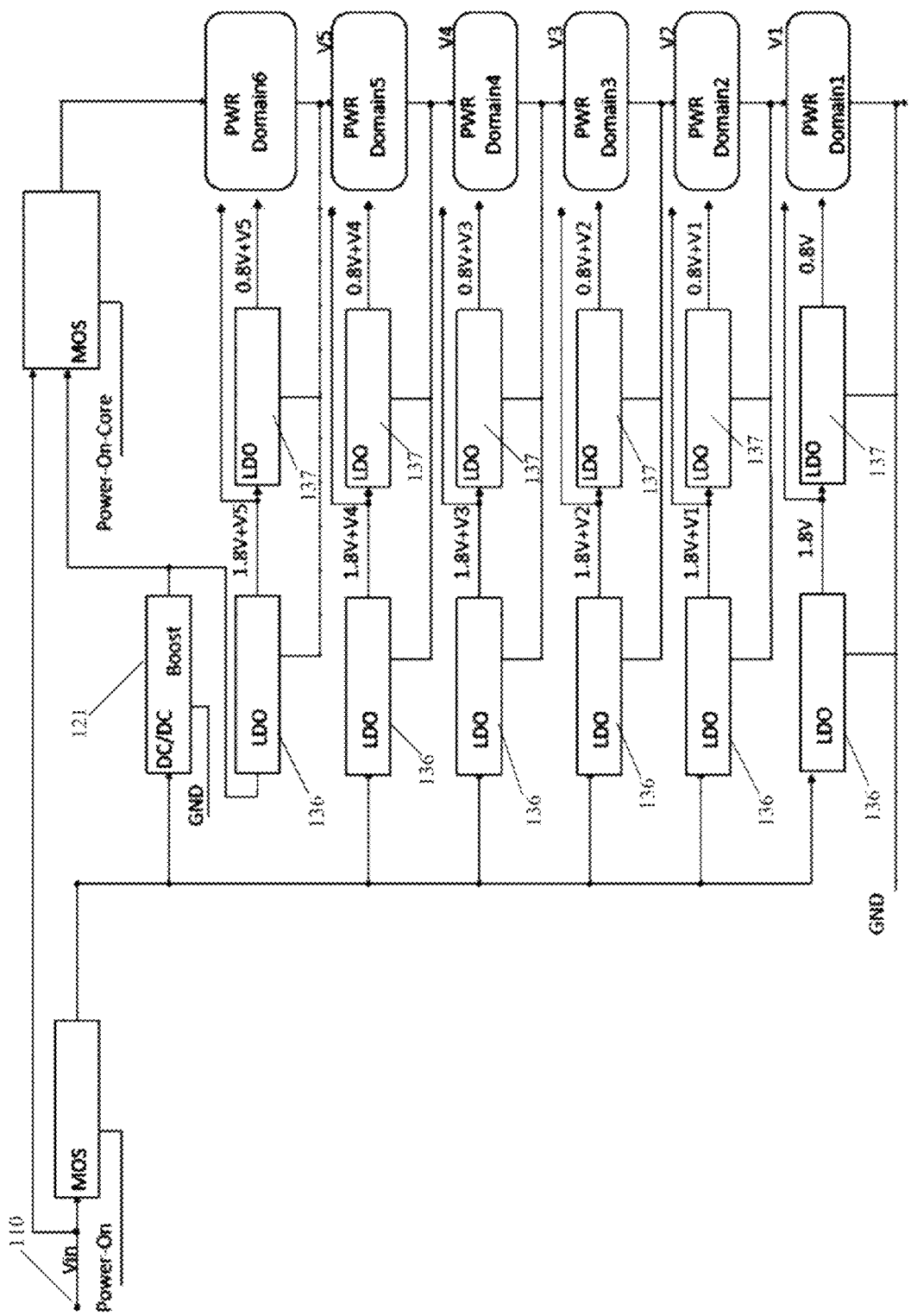
FIG. 4 is a detailed schematic diagram of a power supply circuit according to yet another embodiment of the present application.

In one embodiment of the present application, as shown in FIG. 2, FIG. 3 or FIG. 4, the first power management module 120 includes a first power conversion unit 121.

The first power conversion unit 121 is connected to the power module 110 and the core of the computing chip respectively, so that the first power conversion unit 121 can supply power to the core of the computing chip according to a voltage Vin provided by the power module 110.

In a specific example, the first power conversion unit 121 is configured as a DCDC conversion unit, for example.

In an embodiment of the present application, as shown in FIG. 2, the second power management module 130 includes a second power conversion unit 131 and at least one voltage stabilizing module 132.

The second power conversion unit 131 is connected to the power module 110. At least one voltage stabilizing module 132 is correspondingly connected in series between the second power conversion unit 131 and the corresponding at least one voltage domain, namely PWR DomainN, where N is a positive integer. In the example shown in FIG. 2, N is, for example, 6, that is, there are multiple voltage domains, that is, the first voltage domain PWR Domain1 to the sixth voltage domain PWR Domain6. Before the first power management module 120 supplies power to the core of the computing chip, that is, the core power supply, the power module 110 correspondingly supplies power to at least one voltage domain through the second power conversion unit 131 and at least one voltage stabilizing module 132.

In other words, that is, one end of the second power conversion unit 131 is connected with the power module 110, another end is connected with one ends of the plurality of voltage stabilizing modules 132, and another ends of the plurality of voltage stabilizing modules 132 are connected with a plurality of voltage domains in a one-to-one correspondence. Therefore, before the first power conversion unit 121 supplies power to the core of the computing chip, that is, the core power supply, according to the voltage Vin provided by the power module 110, the second power conversion unit 131 can correspondingly supply power to the plurality of voltage domains according to the voltage Vin provided by the power module 110 via the plurality of voltage stabilizing modules 132, thus realizing that the IO power supply of the multi-voltage domain computing chip is activated before the core power supply, avoiding potential risks caused by the IO power supply of the computing chip being powered later than the core power supply, and improving the security of the power supply circuit 100.

In a specific example, the second power conversion unit 131 is configured as a DCDC conversion unit, for example.

In one embodiment of the present application, as shown in FIG. 2, each voltage stabilizing module 132 includes a first diode 1321, a second diode 1322, a capacitor 1323, a first voltage stabilizing unit 1324 and a second voltage stabilizing unit 1325.

The cathode of the first diode 1321 is connected with the cathode of the second diode 1322, the anode of the first diode 1321 is connected with the second power conversion unit 131, and the connection point of the cathode of the first diode 1321 and the cathode of the second diode 1322 is connected with one end of the capacitor 1323. Another end of the capacitor 1323 is connected to ground, and one end of the capacitor 1323 is further connected with one end of the first voltage stabilizing unit 1324. Another end of the first voltage stabilizing unit 1324 is connected with one end of the second voltage stabilizing unit 1325. Another end of the second voltage stabilizing unit 1325 is connected to a corresponding voltage domain.

For example, as shown in FIG. 2, the at least one voltage stabilizing module 132 is, for example, five. Correspondingly, the capacitors 1323 included in the corresponding five voltage stabilizing modules 132 are C1 to C5, respectively, and the voltage domains connected to the corresponding five voltage stabilizing modules 132 are the first voltage domain to the fifth voltage domain, namely PWR Domain1 to PWR Domain5, respectively.

In a specific example, the first voltage stabilizing unit 1324 and the second voltage stabilizing unit 1325 are configured as LDO (low dropout regulator), for example.

In an embodiment of the present application, specifically, before the first power management module 120 supplies power to the core, that is, before the core of the computing chip is powered, the power module 110 supplies power to the capacitors 1323 (including C1 to C5) through the second power conversion unit 131. When the first power management module 120 supplies power to the core, that is, at the moment when the core is powered, the potentials of the capacitors 1323 (including C1 to C5) are raised in turn, and the capacitors 1323 supply power to the first voltage stabilizing unit 1324 and the second voltage stabilizing unit 1325 through the power stored in the capacitors 1323. At this time, the capacitors 1323 (including C1 to C5) will experience voltage drop. After the first power management module 120 supplies power to the core, that is, after the core is normally powered, the core of the computing chip, that is, the core power supply, supplies power to the capacitors 1323 (including C1 to C5) to ensure that the LDO at its subsequent stage (that is, the first voltage stabilizing unit 1324 and the second voltage stabilizing unit 1325) is normally powered, and realize the power supply to each voltage domain, that is, after the core is powered by the power module 110 through the first power conversion unit 121, the core generates voltages in stages to supply power to subsequent voltage domains. Therefore, the voltage domain can be powered before the core of the computing chip is powered, realizing that the IO power supply of the multi-voltage domain computing chip is activated before the core power supply, thus avoiding the potential risks caused by the IO power supply of the computing chip being powered later than the core power supply, and improving the safety of the power supply circuit 100.

The output voltage of the second power conversion unit 131 and the capacitances of the capacitors 1323 (including C1 to C5) are preset, and the setting basis is to ensure the stability of IO voltage in each voltage domain as much as possible at the moment of power-on.

In a specific embodiment, the IO power supply current in a single voltage domain is set to 100 mA, the output voltage of the second power conversion unit 131 is 3.5V, the LDO (including the first voltage stabilizing unit 1324 and the second voltage stabilizing unit 1325) generates a voltage drop of 2V, and the voltage drop of the diode (including the first diode 1321 and the second diode 1322) is 0.5V. It should be noted that the minimum input threshold for LDO to normally generate 1.8V is 1.8V+0.1Vdrop, and 2V is used here.

Then, the IO voltage of each voltage domain $\Delta U=3.5-0.5-2=1V$

Set the power-on time of the core of the computing chip, that is, the core power supply, is 200 uS, the minimum value of capacitor 1323 required by LDO is C=200 us*100 mA/1V=20 uF, that is, the values of C1 to C5 can be 20 uF.

In a specific example, the capacitors 1323 (including C1 to C5) can be selected as a capacitor with a large capacitance, such as but not limited to a stable polymer capacitor, with a withstand voltage of 6.3V or above, and its capacitance can actually be 100 uF or 220 uF.

In an embodiment of the present application, as shown in FIG. 2, the second power management module 130 further includes a third power conversion unit 133.

As shown in FIG. 2, the third power conversion unit 133 is connected with a voltage domain connected with the first power management module 120 among the at least one voltage domain through a first voltage stabilizing unit 1324 and a second voltage stabilizing unit 1325, and is configured to supply power to the voltage domain. For example, as shown in FIG. 2, the voltage domain connected with the first power management module 120 among the at least one voltage domain is the sixth voltage domain PWR Domain6, that is, the third power conversion unit 133 is connected with the sixth voltage domain PWR Domain6 through a first voltage stabilizing unit 1324 and a second voltage stabilizing unit 1325, and can supply power to the sixth voltage domain PWR Domain6. As mentioned above, before the core of the computing chip, that is, the core power supply is powered, the first to fifth voltage domains, namely PWR Domain1 to PWR Domain5, are powered by the power module 110 through the first power conversion unit 121 and the corresponding voltage stabilizing module 132.

In a specific example, the third power conversion unit 133 is configured as a DCDC conversion unit, for example.

In another embodiment of the present application, as shown in FIG. 3, the second power management module 130 includes at least one fourth power conversion unit 134 and at least one third voltage stabilizing unit 135.

The at least one fourth power conversion unit 134 is connected with the power module 110. The at least one third voltage stabilizing unit 135 is correspondingly connected in series between at least one fourth power conversion unit 134 and at least one corresponding voltage domain.

Specifically, that is, one end of the at least one fourth power conversion unit 134 is connected with the power module 110, respectively, another end is connected with one end of the at least one third voltage stabilizing unit 135 in a one-to-one correspondence, and another end of the at least one third voltage stabilizing unit 135 is connected with at least one voltage domain in a one-to-one correspondence. Therefore, before the first power conversion unit 121 supplies power to the core of the computing chip according to the voltage Vin provided by the power module 110, the fourth power conversion unit 134 can supply power to the corresponding voltage domain according to the voltage Vin provided by the power module 110 through the corresponding third voltage stabilizing unit 135, so that the voltage domain can be powered before the core of the computing chip is powered, thus realizing that the IO power supply of the multi-voltage domain computing chip is activated before the core power supply, and the potential risk caused by the IO power supply of the computing chip being powered later than the core power supply is avoided, and the safety of the power supply circuit 100 is improved.

In a specific example, the fourth power conversion unit 134 is configured as a DCDC conversion unit, for example.

In a specific embodiment, the value selection method of the output voltage of the fourth power conversion unit 134 is similar to the value selection method of the second power conversion unit 131 shown in FIG. 2, which is not described here.

In a specific embodiment, the third voltage stabilizing unit 135 is configured as an LDO.

In another embodiment of the present application, as shown in FIG. 4, the second power management module 130 includes at least one fourth voltage stabilizing unit 136 and at least one fifth voltage stabilizing unit 137 connected in series in a one-to-one correspondence. The at least one fourth voltage stabilizing unit 136 is connected to the power module 110, respectively, and the at least one fifth voltage stabilizing unit 137 is connected with at least one voltage domain correspondingly.

Specifically, that is, the at least one fourth voltage stabilizing unit 136 and the at least one fifth voltage stabilizing unit 137 are connected in series in a one-to-one correspondence. One end of at least one fourth voltage stabilizing unit 136 is connected with the power module 110, respectively, another end is connected with one end of the at least one fifth voltage stabilizing unit 137 correspondingly, and another end of the at least one fifth voltage stabilizing unit 137 is connected with the at least one voltage domain correspondingly. Therefore, before the first power conversion unit 121 supplies power to the core of the computing chip according to the voltage Vin provided by the power module 110, the power module 110 can directly supply power to the corresponding voltage domain through the fourth voltage stabilizing unit 136 and the fifth voltage stabilizing unit 137, respectively, so that the voltage domain can be powered before the core of the computing chip is powered, thus realizing that the IO power supply of the multi-voltage domain computing chip is activated before the core power supply, and the potential risk caused by the IO power supply of the computing chip being powered later than the core power supply is avoided, and the safety of the power supply circuit 100 is improved.

In a specific embodiment, the fourth voltage stabilizing unit 136 and the fifth voltage stabilizing unit 137 are configured as LDOs.

In a specific embodiment, the power supply circuit 100 of the above embodiment of the present application can be applied to the power supply of the computing chip, for example, and further can be applied to a mining machine product with series power supply.

According to the power supply circuit of the embodiment of the application, before the first power management module supplies power to the core of the computing chip according to the voltage provided by the power module, the second power management module supplies power to the corresponding voltage domain according to the voltage provided by the power module in the first place. That is, the voltage domain can be powered before the core of the computing chip is powered, thereby realizing that the IO power supply of the multi-voltage domain computing chip is activated before the core power supply, avoiding the potential risk caused by the IO power supply of the computing chip being powered later than the core power supply, and improving the safety of the power supply circuit.

The embodiment of the application also provides a chip, which includes the power supply circuit described in any above embodiment of the application.

Therefore, the corresponding specific implementation of the chip in the embodiment of the present application is similar to the specific implementation of the power supply circuit in the embodiment of the present application. For details, please refer to the description of the power supply circuit, and is not repeated here in order to reduce redundancy.

In a specific embodiment, the power supply circuit of the above embodiment of the present application can be applied, for example, to a mining machine product with series power supply.

According to the chip of the embodiment of the application, the power supply circuit of which, before the first power management module supplies power to the core of the computing chip according to the voltage provided by the power module, the second power management module supplies power to the corresponding voltage domain according to the voltage provided by the power module in the first place. That is, the voltage domain can be powered before the core of the computing chip is powered, thereby realizing that the IO power supply of the multi-voltage domain computing chip is activated before the core power supply, avoiding the potential risk caused by the IO power supply of the computing chip being powered later than the core power supply, and improving the safety of the power supply circuit.

In addition, other structures and functions of the chip according to the above-mentioned embodiments of the present application are known to those skilled in the art, and is not repeated here in order to reduce redundancy.

A further embodiment of the present application also provides an electronic device, including the power supply circuit described in any one of the above embodiments of the present application or the chip described in any one of the above embodiments of the present application.

Therefore, the corresponding specific implementation of the electronic device in the embodiment of the present application is similar to the specific implementation of the power supply circuit or chip in the embodiment of the present application. For details, please refer to the description of the power supply circuit or chip, and will not be repeated here in order to reduce redundancy.

In a specific embodiment, the electronic device of the embodiment of the present application can be, for example, a mining machine product with series power supply.

The electronic device according to the embodiment of the present application, the power supply circuit or chip of which, before the first power management module supplies power to the core of the computing chip according to the voltage provided by the power module, the second power management module supplies power to the corresponding voltage domain according to the voltage provided by the power module in the first place. That is, the voltage domain can be powered before the core of the computing chip is powered, thereby realizing that the IO power supply of the multi-voltage domain computing chip is activated before the core power supply, avoiding the potential risk caused by the IO power supply of the computing chip being powered later than the core power supply, and improving the safety of the power supply circuit.

In the description of the present application, it should be understood that, the directions or positional relationships indicated by the terms "center", "vertical", "horizontal", "length", "width", "thickness", "up", "down", "front", "back", "left", "right", "vertical", "horizontal", "top", "bottom", "inside", "outside", "clockwise" "counterclockwise" "axial", "radial" and "circumferential" are based on the directions or positional relationships shown in the accompanying drawings, which are only for the convenience of describing the present application and simplifying the description, and do not indicate or imply that the apparatus or elements referred to must have a specific orientation, be constructed and operated in a specific orientation, so they cannot be understood as limitations of the present application.

In the description of the present application, "a plurality of" means two or more.

In the description of the specification, descriptions referring to the terms "one embodiment", "some embodiments", "exemplary embodiments", "examples", or "some examples" mean that specific features, structures, materials or characteristics described in connection with the embodiment or example are included in at least one embodiment or example of the present application. In this specification, the schematic expressions of the above terms do not necessarily refer to the same embodiment or example.

Although embodiments of the present application have been shown and described, those skilled in the art can understand that many changes, modifications, substitutions and variations can be made to these embodiments without departing from the principles and purposes of the present application, and the scope of the present application is defined by the claims and their equivalents.

The invention claimed is:

1. A power supply circuit, comprising:
    a power module, configured to supply power to a computing chip in serial connection;
    a first power management module, connected with the power module and the computing chip, and configured to supply power to a core of the computing chip according to a voltage provided by the power module; and
    at least one second power management module, connected with the power module and the computing chip, and configured to supply power to at least one voltage domain of the computing chip according to the voltage provided by the power module correspondingly before the first power management module supplies power to the core;
    wherein the second power management module comprises:
    a second power conversion unit connected with the power module;
    at least one voltage stabilizing module correspondingly connected in series between the second power conversion unit and the corresponding at least one voltage domain, wherein,
    the power module correspondingly supplies power to the at least one voltage domain through the second power conversion unit and the at least one voltage stabilizing module before the first power management module supplies power to the core.

2. The power supply circuit according to claim 1, wherein the first power management module comprises:
    a first power conversion unit, connected with the power module and the core of the computing chip, respectively.

3. The power supply circuit according to claim 1, wherein each of the voltage stabilizing module comprises a first diode, a second diode, a capacitor, a first voltage stabilizing unit and a second voltage stabilizing unit, wherein,
    a cathode of the first diode is connected with a cathode of the second diode, an anode of the first diode is connected with the second power conversion unit, and the connection point of the cathode of the first diode and the cathode of the second diode is connected with one end of the capacitor;

another end of the capacitor is connected to ground, and one end of the capacitor is further connected with one end of the first voltage stabilizing unit;

another end of the first voltage stabilizing unit is connected with one end of the second voltage stabilizing unit; and another end of the second voltage stabilizing unit is connected with a corresponding voltage domain.

4. The power supply circuit according to claim 3, wherein, the power module supplies power to the capacitor through the second power conversion unit before the first power management module supplies power to the core;

when the first power management module supplies power to the core, a potential of the capacitor is raised, and the capacitor supplies power to the first voltage stabilizing unit and the second voltage stabilizing unit through power stored in the capacitor; and after the first power management module supplies power to the core, the core of the computing chip supplies power to the capacitor.

5. The power supply circuit according to claim 3, wherein the second power management module further comprises:

a third power conversion unit, connected with a voltage domain connected with the first power management module among the at least one voltage domain through one of the first voltage stabilizing unit and one of the second voltage stabilizing unit, and configured to supply power to the voltage domain.

6. The power supply circuit according to claim 1, wherein the second power management module comprises:

at least one fourth power conversion unit connected with the power module;

at least one third voltage stabilizing unit, and the at least one third voltage stabilizing unit is correspondingly connected in series between the at least one fourth power conversion unit and the corresponding at least one voltage domain.

7. The power supply circuit according to claim 1, wherein the second power management module comprises:

at least one fourth voltage stabilizing unit and at least one fifth voltage stabilizing unit connected in series in a one-to-one correspondence, wherein the at least one fourth voltage stabilizing unit is respectively connected with the power module, and the at least one fifth voltage stabilizing unit is correspondingly connected with the at least one voltage domain.

8. A chip, comprising a power supply circuit, wherein the power supply circuit comprises:

a power module, configured to supply power to a computing chip in serial connection;

a first power management module, connected with the power module and the computing chip, and configured to supply power to a core of the computing chip according to a voltage provided by the power module; and at least one second power management module, connected with the power module and the computing chip, and configured to supply power to at least one voltage domain of the computing chip according to the voltage provided by the power module correspondingly before the first power management module supplies power to the core;

wherein the second power management module comprises:

a second power conversion unit connected with the power module;

at least one voltage stabilizing module correspondingly connected in series between the second power conversion unit and the corresponding at least one voltage domain, wherein, the power module correspondingly supplies power to the at least one voltage domain through the second power conversion unit and the at least one voltage stabilizing module before the first power management module supplies power to the core.

9. An electronic device, comprising a power supply circuit, wherein the power supply circuit comprises:

a power module, configured to supply power to a computing chip in serial connection;

a first power management module, connected with the power module and the computing chip, and configured to supply power to a core of the computing chip according to a voltage provided by the power module; and at least one second power management module, connected with the power module and the computing chip, and configured to supply power to at least one voltage domain of the computing chip according to the voltage provided by the power module correspondingly before the first power management module supplies power to the core;

wherein the second power management module comprises:

a second power conversion unit connected with the power module;

at least one voltage stabilizing module correspondingly connected in series between the second power conversion unit and the corresponding at least one voltage domain, wherein, the power module correspondingly supplies power to the at least one voltage domain through the second power conversion unit and the at least one voltage stabilizing module before the first power management module supplies power to the core.

10. The chip according to claim 8, wherein the first power management module comprises:

a first power conversion unit, connected with the power module and the core of the computing chip, respectively.

11. The chip according to claim 8, wherein each of the voltage stabilizing module comprises a first diode, a second diode, a capacitor, a first voltage stabilizing unit and a second voltage stabilizing unit, wherein, a cathode of the first diode is connected with a cathode of the second diode, an anode of the first diode is connected with the second power conversion unit, and the connection point of the cathode of the first diode and the cathode of the second diode is connected with one end of the capacitor;

another end of the capacitor is connected to ground, and one end of the capacitor is further connected with one end of the first voltage stabilizing unit;

another end of the first voltage stabilizing unit is connected with one end of the second voltage stabilizing unit; and another end of the second voltage stabilizing unit is connected with a corresponding voltage domain.

12. The chip according to claim 11, wherein, the power module supplies power to the capacitor through the second power conversion unit before the first power management module supplies power to the core;

when the first power management module supplies power to the core, a potential of the capacitor is raised, and the capacitor supplies power to the first voltage stabilizing unit and the second voltage stabilizing unit through power stored in the capacitor; and after the first power management module supplies power to the core, the core of the computing chip supplies power to the capacitor.

13. The chip according to claim 11, wherein the second power management module further comprises:

a third power conversion unit, connected with a voltage domain connected with the first power management module among the at least one voltage domain through one of the first voltage stabilizing unit and one of the second voltage stabilizing unit, and configured to supply power to the voltage domain.

14. The chip according to claim 8, wherein the second power management module comprises:

at least one fourth power conversion unit connected with the power module;

at least one third voltage stabilizing unit, and the at least one third voltage stabilizing unit is correspondingly connected in series between the at least one fourth power conversion unit and the corresponding at least one voltage domain.

15. The chip according to claim 8, wherein the second power management module comprises:

at least one fourth voltage stabilizing unit and at least one fifth voltage stabilizing unit connected in series in a one-to-one correspondence, wherein the at least one fourth voltage stabilizing unit is respectively connected with the power module, and the at least one fifth voltage stabilizing unit is correspondingly connected with the at least one voltage domain.

16. The electronic device according to claim 15, wherein the first power management module comprises:

a first power conversion unit, connected with the power module and the core of the computing chip, respectively.

17. An electronic device, comprising the chip according to claim 8.

* * * * *